Patented Oct. 17, 1944

2,360,374

UNITED STATES PATENT OFFICE 2,360,374

METHOD OF AND COMPOSITION FOR USE IN PRESERVING SAUSAGE CASINGS

Daniel Topjian, Watertown, Mass., assignor, by mesne assignments, to himself, as trustee No Drawing. Application November 1, 1941, Serial No. 417,564

17 Claims. (Cl. 99—159)

This invention pertains to the preparation and preservation of sausage casings and relates more particularly to a method of and a compound for use in treating natural casings.

Natural casings of animal gut are usually received in this country from foreign sources packed in wooden tierces or cases. Many of these casings come from tropical countries and must be shipped long distances under high temperature conditions. In accordance with usual prior practice the casings are treated with salt before shipment, but salt alone is not always sufficient to prevent spoilage during transit. Moreover, if any piece of iron, for example a nail used in making the tierce, should project into or be accidentally enclosed in the tierce, the salt rapidly corrodes the metal and this corrosion proceeds through the mass of sausage casings spoiling them for a substantial distance from the point at which the corrosion originated. Impurities in the salt employed may also be the cause of damage, either bacterial or chemical, and in consequence there is a very substantial loss due to spoilage in transit when the casings are packed in accordance with the usual prior practice.

When the casings are received in this country they are subjected to varying treatments according to their source of origin. If they come from a country which is not approved by the United States Department of Agriculture they must first be sterilized after arrival. Whether or not they are sterilized after removal from the original tierces or cases in which they come, they are then distended by passing water through them so that their diameter may be measured, the casings being classified according to diameter, and then the casings are measured for length and tied up in hanks, each of a given length, and repacked in salt and placed in cold storage preparatory to shipment to the ultimate user.

In accordance with the present method, and assuming that the salted casings are received as usual packed in tierces or cases, the casings are removed from the containers, washed (sterilized if necessary) and graded for diameter size by the usual method of passing water through them to distend them. They are then saturated with the novel preserving compound in accordance with the present invention.

This novel compound includes an aqueous solution of common salt (sodium chloride), the salt constituting from 25 to 30% of the whole (that is to say, being from 2 to 3 lbs. per gallon of water). In preparing this solution the water is first heated to boiling, the salt is dissolved and the resultant brine is preferably filtered. To this salt solution glycerin is added to constitute from 25 to 30% of the whole. In accordance with one embodiment of the invention honey is also added to make substantially 10% of the whole, and if desired an odoriferous or flavoring substance, for example an essential oil such as oil of nutmeg or cinnamon, is added to the extent of 1 to 2 drams per gallon of solution.

After the selected and measured casings have been saturated with this compound, they are packed in suitable containers, for example cans, glass or earthenware jars, or the like, in which the casings may remain without subjecting them to cold storage and without danger of spoilage until they are used. These containers need not be covered nor sealed. It is preferred to pack the casings after treatment with the compound in cans or similar metal containers, preferably enamel lined, or having such a lining or being of such composition that they will not be attacked by the contents. Preferably these cans or other containers will be provided in different sizes, for example, of a capacity to hold one hank, five hanks, ten hanks or twenty-five hanks of casing, and after these containers have been filled with the treated casings they may be marked on their exterior surfaces so as to show the number of hanks and also the diameter of the casing which has been placed in a particular container, for example, 18–20; 20–22; 22–24 millimeters, etc., these being common sizes for sausage casings. If desired these containers may be covered and hermetically sealed after packing, and they may be packed at a pasteurizing temperature. Containers of the capacities indicated are very convenient for use by the sausage maker who merely selects a can of the proper size, as indicated by the markings on its exterior, and removes the contents for use, with the assurance that the casings in the can will be of the diameter which he desires, and that the length of casing in this individual container will be that which is marked on its exterior. By following this method the necessity for cold storage is eliminated, while at the same time the loss of casings through spoilage is very much reduced.

Moreover, it is no longer necessary for the user to flush the casing with water before stuffing, since the casing may be used directly as removed from its container without any other treatment, thus making a very substantial saving in the cost of sausage making. It is found that casings thus treated with glycerin are so much softer than the usual salt treated casings that they can be fed through the sausage machine more rapidly than usual, thus increasing the production of the sausage machine. Furthermore, the casings are easier and more pleasant to handle than the usual salted casings since they are soft, flexible and do not injure the hands of the operator, while the use of the perfuming or flavoring material eradicates the usual disagreeable odor prevalent in sausage making plants.

A modification of the method just described may be employed in treating the raw casings at the source, preparatory to shipment. Thus, for example, the cleaned casings may first be treated with a saturated salt solution which is then drained off and the casings are then treated with the compound above described and packed in tierces, cases or metal containers and sealed up for shipment. This treatment is such as to preserve the casings from spoilage even if thereafter exposed for a long period to high temperatures such as exist in the holds of vessels sailing tropical seas. Furthermore, it is found that this mode of treatment very much reduces the danger of spoilage from corrosion of intruding metal parts or impurities in the salt, as compared with prior practice.

While as above described it is preferable to employ honey as one of the ingredients of the compound thereby to increase the preservative effect, and also to incorporate an ingredient designed to impart a pleasant flavor or odor to the casings, these latter ingredients are not wholly necessary so far as the prevention of spoilage is concerned, since under most conditions the glycerine and salt in substantially the proportions above described are adequate, although the honey and odoriferous substance are regarded as desirable.

While certain desirable methods of procedure and a desirable preservative compound have herein been described, it is to be understood that the invention is not limited to the precise details herein disclosed, but is to be regarded as broadly inclusive of all equivalents such as may fall within the scope of the appended claims.

I claim:

1. That method of treating sausage casing which comprises as steps washing and grading the previously salted casing, saturating the casing with a preservative composition comprising glycerin and common salt each in 25 to 30% water solution, packing the saturated and wet casing in suitable containers, and maintaining the casings at substantially normal temperatures until used.

2. That method of treating sausage casing which comprises as steps washing the previously salted casings and grading them for size, saturating the casing with a composition containing glycerin mixed with an aqueous salt solution, the composition containing from 25 to 30% each of glycerin and sodium chloride, forming the casings into hanks each of a definite length, and packing the wet casing in containers each of such dimension as to hold a predetermined number of hanks of casing.

3. That method of treating sausage casing which comprises as steps saturating the previously salted and sized casing with an aqueous solution of glycerin and common salt, each in from 25 to 30% concentration, packing a predetermined length of the wet casing of a given diameter in a suitable container, and marking the container to indicate the size and length of casing therein.

4. That method of treating sausage casing thereby to preserve it against spoilage during shipment and storage, which comprises as a step saturating the casing with an aqueous solution comprising from 25 to 30% glycerin and from 25 to 30% sodium chloride.

5. That method of treating sausage casing thereby to preserve it against spoilage during shipment and storage, which comprises as a step saturating the casing with an aqueous solution comprising common salt, glycerin and honey, the salt and glycerin together constituting from 50 to 60% of the whole.

6. That method of treating sausage casing thereby to preserve it against spoilage during shipment and storage, which comprises as a step saturating the casing with an aqueous solution comprising approximately 10% honey, and glycerin and common salt which together constitute 50% or more of the whole.

7. That method of treating sausage casing thereby to preserve it against spoilage during shipment and storage, which comprises as a step saturating the casing with an aqueous solution comprising glycerin and common salt which together constitute from 50 to 60% of the whole, and honey constituting approximately 10% of the whole, the solution also comprising a substance capable of imparting thereto a pleasing odor.

8. That method of treating sausage casing thereby to preserve it against spoilage during shipment and storage, which comprises as a step saturating the casing with an aqueous solution comprising glycerin and salt which together constitute from 50 to 60% of the whole, the compound also including a flavoring substance.

9. That method of treating sausage casing thereby to preserve it against spoilage during shipment and storage, which comprises as steps saturating the casing with an aqueous solution comprising from 25 to 30% glycerin and from 25 to 30% sodium chloride, packing the wet saturated casing in a container designed to hold a predetermined length of casing, and hermetically sealing the container.

10. That method of treating sausage casing thereby to preserve it against spoilage during shipment and storage, which comprises as steps saturating the casing with an aqueous solution comprising glycerin and common salt each constituting from 25 to 30% of the whole, packing the moist saturated casing in a metal container having an inner surface which is resistant to attack by the solution, sealing the container, and marking upon its exterior the size and length of the contained casing.

11. That method of treating sausage casing thereby to preserve it against spoilage during shipment and in storage, which comprises as steps washing the previously salted casing, grading it for size, saturating the casing with an aqueous solution comprising glycerin, common salt, honey and an odoriferous substance, the salt and glycerine each being in from 25 to 30% concentration, packing a predetermined length of wet casing of a definite size in a container of such dimensions as to permit it easily to be handled, closing the container and marking upon its exterior the size and length of the contained casing.

12. That method of treating sausage casing thereby to preserve it against spoilage during transit and storage, which comprises as steps treating the raw casing with a substantially saturated salt solution, draining away surplus liquid, saturating the casing with an aqueous solution comprising from 25 to 30% common salt and from 25 to 30% glycerin, packing the wet saturated casing in a suitable container, and sealing the container.

13. A composition for use in treating sausage casings thereby to preserve them against spoilage, said composition comprising glycerin mixed with an aqueous solution of sodium chloride, the sodium chloride and the glycerin each constituting from 25 to 30% of the whole.

14. A composition for use in treating sausage casings to preserve them against spoilage, said composition comprising salt and glycerin mingled with water, the salt and glycerin together constituting from 50 to 60% of the whole, and honey constituting approximately 10% of the whole.

15. A composition for use in preserving sausage casings, said composition comprising salt and glycerin which together constitute 50% or more of the whole, the composition also comprising a small quantity of an odoriferous substance.

16. A composition for use in preserving sausage casings against spoilage, said composition comprising glycerin and sodium chloride, the glycerin and sodium chloride each constituting from 25 to 30% of the whole, the composition also comprising approximately 10% honey and from 1 to 2 drams per gallon of an aromatic substance.

17. A composition for use in preserving sausage casings, said composition comprising 25 to 30% of common salt, 25 to 30% glycerin, approximately 10% honey, and from 1 to 2 drams per gallon of oil of nutmeg.

DANIEL TOPJIAN.